(12) United States Patent
Qu

(10) Patent No.: US 11,899,924 B2
(45) Date of Patent: Feb. 13, 2024

(54) NOTIFICATION MESSAGE DISPLAY CONTROL METHOD AND APPARATUS, ELECTRONIC DEVICE, AND READABLE STORAGE MEDIUM

(71) Applicant: VIVO MOBILE COMMUNICATION CO., LTD., Guangdong (CN)

(72) Inventor: Jinxia Qu, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 0 days.

(21) Appl. No.: 18/175,768

(22) Filed: Feb. 28, 2023

(65) Prior Publication Data

US 2023/0214111 A1 Jul. 6, 2023

Related U.S. Application Data

(63) Continuation of application No. PCT/CN2021/116424, filed on Sep. 3, 2021.

(30) Foreign Application Priority Data

Sep. 4, 2020 (CN) .......................... 202010921679.3

(51) Int. Cl.
G06F 17/00 (2019.01)
G06F 3/0488 (2022.01)
G06F 3/04817 (2022.01)
G06F 3/0484 (2022.01)

(52) U.S. Cl.
CPC .......... *G06F 3/0488* (2013.01); *G06F 3/0484* (2013.01); *G06F 3/04817* (2013.01)

(58) Field of Classification Search
CPC .. G06F 3/0488; G06F 3/04817; G06F 3/0484; G06F 3/04842; G06F 3/04847; G06F 3/0485; G06F 3/04883; G06F 3/0482
See application file for complete search history.

(56) References Cited

U.S. PATENT DOCUMENTS

| 11,606,325 B2* | 3/2023 | Wang ..................... H04L 51/226 |
| 2015/0185947 A1* | 7/2015 | Tsai ....................... G06F 3/0488 |
| | | 345/173 |
| 2015/0188871 A1* | 7/2015 | Lewis ..................... H04L 67/55 |
| | | 709/207 |
| 2016/0277346 A1 | 9/2016 | Xu et al. |

(Continued)

FOREIGN PATENT DOCUMENTS

| CN | 106126399 A | 11/2016 |
| CN | 108235811 A | 6/2018 |

(Continued)

*Primary Examiner* — Laurie A Ries
(74) *Attorney, Agent, or Firm* — Price Heneveld LLP

(57) ABSTRACT

A notification message display control method and apparatus, an electronic device, and a readable storage medium are disclosed. The method includes: obtaining N notification messages of T application programs; and displaying target information of the N notification messages separately in M display areas; where different display areas are used for displaying notification messages of different program importance levels, the program importance level is an importance level of an application program, M, N, and T are all integers greater than 1, and M and T are both less than or equal to N.

20 Claims, 9 Drawing Sheets

(56) References Cited

U.S. PATENT DOCUMENTS

| | | | | |
|---|---|---|---|---|
| 2018/0324567 A1* | 11/2018 | Mao | ...................... | H04M 1/725 |
| 2019/0310764 A1 | 10/2019 | Li | | |
| 2019/0379627 A1 | 12/2019 | Wang et al. | | |
| 2020/0118137 A1* | 4/2020 | Sood | ...................... | G06Q 10/00 |
| 2020/0228642 A1* | 7/2020 | Choi | ................. | H04M 1/72472 |
| 2020/0259946 A1* | 8/2020 | Mao | .................... | G06F 3/04883 |
| 2020/0310858 A1* | 10/2020 | Ren | ..................... | G06F 3/04817 |
| 2021/0278955 A1* | 9/2021 | Lee | ....................... | G06F 3/0482 |
| 2022/0286422 A1* | 9/2022 | Wang | ................... | H04L 51/216 |

FOREIGN PATENT DOCUMENTS

| | | | | | |
|---|---|---|---|---|---|
| CN | 108595084 A | | 9/2018 | | |
| CN | 109788131 A | | 5/2019 | | |
| CN | 109788136 A | | 5/2019 | | |
| CN | 110231972 A | * | 9/2019 | ........... | G06F 3/0483 |
| CN | 110231972 A | | 9/2019 | | |
| CN | 111124573 A | * | 5/2020 | ........... | G06F 3/0481 |
| CN | 111124573 A | | 5/2020 | | |
| CN | 112099685 A | | 12/2020 | | |
| CN | 113296649 A | * | 8/2021 | ......... | G06F 3/04817 |

\* cited by examiner

NOTIFICATION MESSAGE DISPLAY CONTROL METHOD AND APPARATUS, ELECTRONIC DEVICE, AND READABLE STORAGE MEDIUM

CROSS-REFERENCE TO RELATED APPLICATIONS

This application is a continuation application of International Application No. PCT/CN2021/116424 filed on Sep. 3, 2021, which claims priority to Chinese Patent Application No. 202010921679.3, filed in China on Sep. 4, 2020, which are incorporated herein by reference in their entireties.

TECHNICAL FIELD

This application pertains to the field of communication technologies, and relates to a notification message display control method and apparatus, an electronic device, and a readable storage medium.

BACKGROUND

At present, when an application program on an electronic device receives a notification message, a digit badge is usually displayed in the upper right corner of a corresponding application icon to remind a user that application programs corresponding to the application icons displaying such badges have unread notification messages that need to be processed. When a plurality of application icons in the desktop display corner each have a badge, the user needs to tap the application icons with badges one by one to view corresponding notification messages one by one, and there are usually a lot of types of notification messages, including promotion, consumption, upgrade, update recommendation, and the like. It is difficult for the user to determine, based on an application icon, whether a notification message is an important notification and needs to be viewed and processed.

It can be learned that a notification message display manner brings inconvenience to user operations, resulting in low efficiency of processing messages by users.

SUMMARY

According to a first aspect, an embodiment of this application provides a notification message display control method, including:
obtaining N notification messages of T application programs; and
displaying target information of the N notification messages separately in M display areas; where
different display areas are used for displaying notification messages of different program importance levels, the program importance level is an importance level of an application program, M, N, and T are all integers greater than 1, and M and T are both less than or equal to N.

According to a second aspect, an embodiment of this application provides a notification message display control apparatus, including:
a first obtaining module, configured to obtain N notification messages of T application programs; and
a display module, configured to display target information of the N notification messages separately in M display areas; where
different display areas are used for displaying notification messages of different program importance levels, the program importance level is an importance level of an application program, M, N, and T are all integers greater than 1, and M and T are both less than or equal to N.

According to a third aspect, an embodiment of this application provides an electronic device, where the electronic device includes a processor, a memory, and a program or instructions stored in the memory and capable of running on the processor, and when the program or the instructions are executed by the processor, the steps of the method according to the first aspect are implemented.

According to a fourth aspect, an embodiment of this application provides a readable storage medium, where a program or instructions are stored in the readable storage medium, and when the program or the instructions are executed by a processor, the steps of the method according to the first aspect are implemented.

According to a fifth aspect, an embodiment of this application provides a chip, where the chip includes a processor and a communications interface, the communications interface is coupled to the processor, and the processor is configured to run a program or instructions to implement the method according to the first aspect.

DETAILED DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application may be implemented in other orders than the order illustrated or described herein, and "first", "second", and the like are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

The following describes in detail a notification message display control method provided in the embodiments of this application by using specific embodiments and application scenarios thereof with reference to the accompanying drawings.

Figure 1:
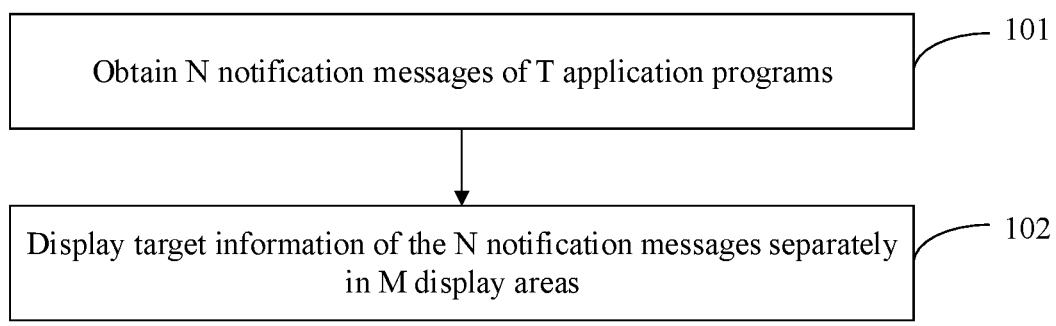
FIG. 1 is a flowchart of a notification message display control method according to an embodiment of this application.

Refer to FIG. 1. FIG. 1 is a flowchart of a notification message display control method according to an embodiment of this application. As shown in FIG. 1, the method includes the following steps.

Step 101: Obtain N notification messages of T application programs.

In this embodiment of this application, in order to display a plurality of notification messages of a plurality of application programs in a centralized manner, N notification messages of T application programs may be obtained first, where N and T are both integers greater than 1, and T is less than or equal to N. The T application programs may be any application programs installed on an electronic device. Optionally, notification messages of application programs currently having unread notification messages are obtained, that is, unread notification messages of all application programs on the electronic device may be obtained. Notification messages of application programs are usually displayed through deeplink or H5 links, for example, when a notification message is tapped to view complete content of the notification message, it will jump to a page corresponding to a Deeplink or H5 link that corresponds to the notification message. Therefore, the obtaining N notification messages of T application programs may be extracting Deeplink or H5 links of notifications of the T application programs.

An application icon of each of the T application programs includes a message badge, and the message badge is used to indicate the number of notification messages of each application program. That is, the T application programs may be application programs with message badges displayed on a desktop of the electronic device. When an application program receives a notification message, a message badge is usually used for marking an application icon of the application program. The message badge is usually a digit badge, and a digit indicates how many messages the application program currently has. In this way, notification messages of application programs displayed with message badges on the desktop of the electronic device may be obtained. Optionally, it may be determined first whether application program icons with message badge notifications are present in an application folder. If yes, an application program with a message badge notification being in the application folder and an application program with a message badge notification being not in the application folder may be selected; if not, an application program with a message badge notification being not in the application folder may be selected and then a Deeplink or H5 link of a notification of the selected application program is extracted.

Optionally, step 101 includes:

in a case that a preset input is received, obtaining the N notification messages of the T application programs.

The preset input may be a specific input defined by the user or preset by the system, and the preset input may be used to trigger display of current unread notification messages of applications. For example, the preset input may be an input such as tapping a screen N times or double-tapping a status bar area.

That is, the N notification messages of the T application programs may be obtained based on a preset trigger input performed by a user, so as to display the N notification messages according to a specific rule.

Step 102: Display target information of the N notification messages separately in M display areas.

Different display areas are used for displaying notification messages of different program importance levels, the program importance level is an importance level of an application program, M is an integer greater than 1, and M is less than or equal to N.

In this embodiment of this application, for the obtained N notification messages of the T application programs, the target information of the N notification messages may be displayed in different areas based on the program importance levels of the T application programs, where the target information may include an application icon of an application program to which a notification message belongs, a notification time, a notification message title, part of notification content, a picture, and the like.

Optionally, notification messages of application programs with a same program importance level may be displayed in a same display area, and notification messages of application programs with different program importance levels may be displayed in different display areas. The N notification messages may be displayed in descending order of program importance levels. To be specific, a display area of notification messages of application programs with a higher program importance level is located in front, and a display area of notification messages of application programs with a lower program importance level is located behind, so that the user may view and process the notification messages of the application programs with the higher program importance level.

The program importance level corresponding to each of the M display areas is different, that is, the T application programs have M different program importance levels, so that the N notification messages are separately displayed in the M display areas based on the program importance levels.

Figure 2A:
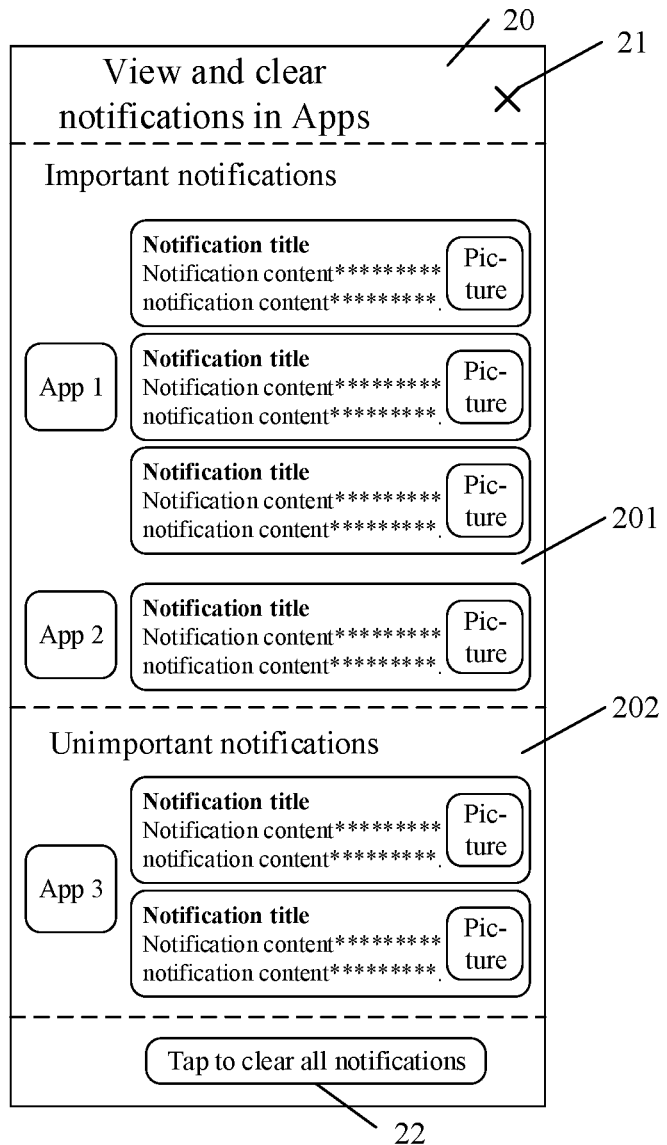
FIG. 2a is a first schematic diagram of displaying application notification messages on a notification message display page according to an embodiment of this application.
Figure 2B:
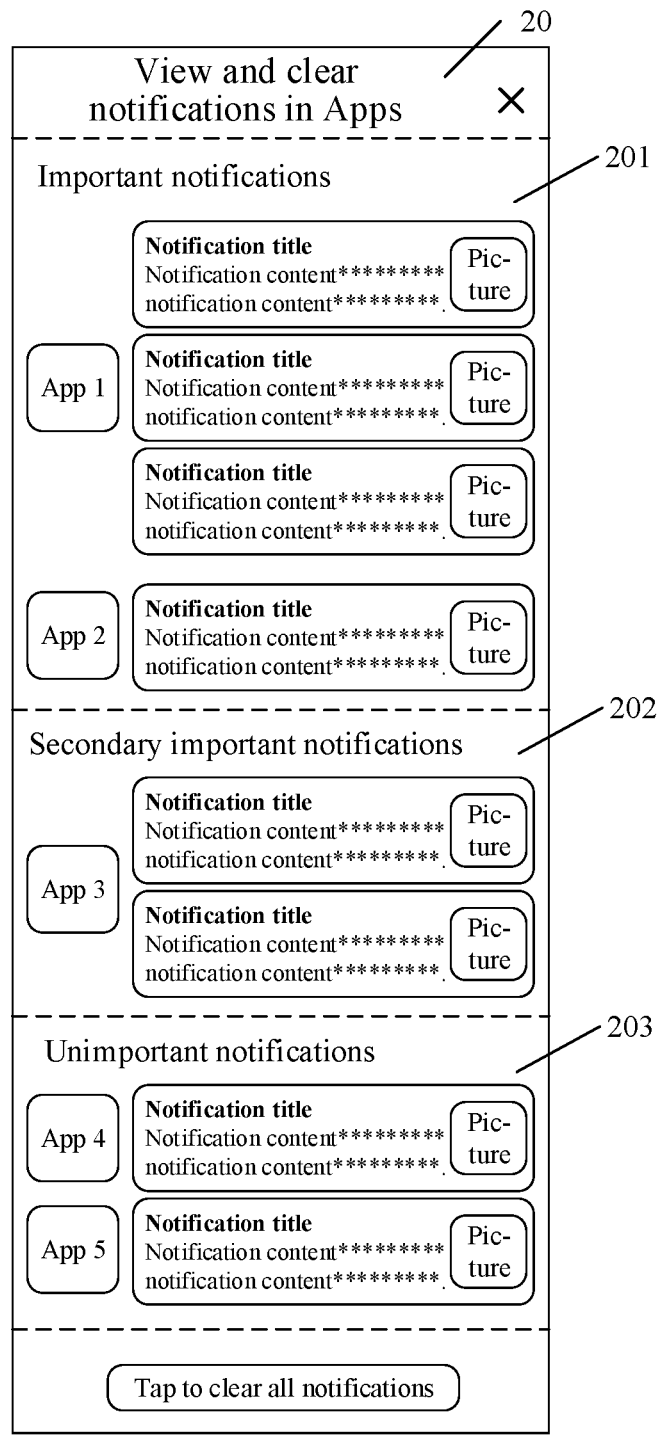
FIG. 2b is a second schematic diagram of displaying application notification messages on a notification message display page according to an embodiment of this application.

For example, as shown in FIG. 2a, program importance levels of an application 1 and an application 2 are the same and higher than a program importance level of an application 3. Therefore, notification messages of the application 1 and the application 2 may be displayed in a display area 201, and notification messages of the application 3 are displayed in a display area 202. The display area 201 is located before the display area 202. As shown in FIG. 2b, program importance levels of an application 1 and an application 2 are the same and higher than a program importance level of an application 3, and program importance levels of an application 4 and an application 5 are the same and lower than the program importance level of the application 3. Therefore, notification messages of the application 1 and the application 2 may be displayed in a display area 201, notification messages of the application 3 are displayed in a display area 202, and notification messages of the application 4 and the application 5 are displayed in a display area 203. The display area 201 is located before the display area 202, and the display area 202 is located before the display area 203.

When a plurality of application programs have a same program importance level, notification messages of the plurality of application programs may be displayed sequentially in an order of notification time in a display area corresponding to the plurality of application programs; or the plurality of application programs may be classified by importance degree, and the notification messages of the plurality of application programs are displayed in descending order of importance degrees. For example, the application 1, the application 2, and the application 3 have a same program importance level and are all displayed in a display area 1. However, an importance degree of the application 2 is higher than an importance degree of the application 1, and the importance degree of the application 1 is higher than an importance degree of the application 3. In this case, notification messages of the application 2, the application 1, and the application 3 may be displayed in sequence in the display area 1.

It should be noted that the program importance levels of the T application programs may be customized by the user. For example, most concerned application programs are set to a highest importance level, frequently used application programs are set to a medium importance level, less frequently used application programs are set to a lowest importance level, and so on. Alternatively, the system may determine a program importance level of each application program based on usage parameters of the T application programs, that is, some related parameters for using the application programs by the user, such as use duration, use frequency, and notification message viewing duration.

It should be further noted that the M display areas may be located on a same screen or on different screens. For example, notification messages of application programs with higher program importance levels are displayed in several display areas on a home screen, and notification messages of application programs with lower program importance levels are displayed in several display areas on a secondary screen. Optionally, M display areas may be divided from a status bar (such as a status bar in a pull-down menu), or M display areas may be divided from a newly created notification message display page, for displaying the target information of the N notification messages.

In this way, the N notification messages are displayed in different areas based on the program importance levels, so that the user may intuitively know importance levels of notification messages in each display area. This further helps the user to quickly locate notification messages of a target importance level according to user requirements and quickly review and process the notification messages.

Optionally, before step 102, the method further includes:
obtaining usage parameters of the T application programs;
determining program importance levels of the T application programs based on the usage parameters of the T application programs; and
determining the M display areas based on the program importance levels of the T application programs.

That is, in this implementation, the program importance levels of the T application programs may be determined based on the usage parameters of the T application programs, so as to further determine the M display areas.

The usage parameters may be some related parameters for using the application programs by the user, such as use duration, use frequency, notification message viewing duration, and arrangement position of application icon arrangement position. Generally, an application program having a longer use duration, a higher use frequency, a longer notification message viewing duration, and an application icon arrangement position arranged closer to the home screen indicates that the application program is often used by the user and has a relatively high importance degree to have a higher program importance level; otherwise, the application program has a relatively low importance degree to have a lower program importance level. Therefore, statistics may be collected on usage parameters of each of the T application programs, so as to determine a program importance level of each application program. Optionally, a corresponding calculation formula may alternatively be set based on the usage parameters to calculate an importance degree of each application program, so as to further determine a program importance level to which the application program belongs. An application with a higher importance degree also has a higher important level.

After determining the program importance level of each of the T application programs, a corresponding quantity of display areas may be determined based on the total number of program importance levels of the T application programs. For example, among the six application programs, two application programs have a highest program importance level, three application programs have a medium program importance level, and one application program has a lowest program importance level. There are three program importance levels in total, and therefore three display areas may be determined.

In this way, the importance level of each application program is determined based on a usage habit of the user. This ensures that the determined importance level of the application program is more reliable, not requiring the user to set the importance level of each application program in advance.

Optionally, the determining program importance levels of the T application programs based on the usage parameters of the T application programs includes:
determining importance coefficients of the T application programs based on the usage parameters of the T application programs; and
determining, based on the importance coefficients of the T application programs, a program importance level to which each of the T application programs belongs; where
different program importance levels correspond to different importance coefficient ranges.

In this implementation, the importance coefficients of the T application programs may be first determined based on the usage parameters of the T application programs. For example, the importance coefficient of each application program is calculated using a preset formula based on the usage parameters of each application program.

The program importance level to which each of the T application programs belongs is then determined based on the importance coefficient of each application program. Optionally, a plurality of program importance levels may be obtained through division in advance, and an importance coefficient range corresponding to each program importance level may be defined, so as to determine the program importance levels of the T application programs based on ranges within which the importance coefficients of the T application programs fall. For example, those with importance coefficients being greater than or equal to a first preset threshold belong to the highest program importance level, those with importance coefficients being less than the first preset threshold and greater than or equal to a second preset threshold belong to the medium program importance level, and those with importance coefficients being less than the second preset threshold belong to the lowest program importance level. The first preset threshold is greater than the second preset threshold, and the first preset threshold and the second preset threshold may be set by the system by default, or may be optionally set by the user as needed. Certainly, only two program importance levels may alternatively be obtained through division, or more program importance levels may be obtained through division.

In this way, the importance coefficients of the T application programs are first determined, and then the program importance level to which each of the T application programs belongs is determined based on the importance coefficients of the T application programs, so as to ensure that the importance levels of the T application programs are more finely obtained through division.

It should be noted that after the program importance levels of the T application programs are determined, the N notification messages of the T application programs may be divided into notification messages of different importance levels accordingly, and the target information of the N notification messages is displayed in the M display areas based on the importance levels.

Using two program importance levels as an example, application programs with an importance coefficient greater than or equal to 8 in the T application programs may be determined as a first program importance level, and notification messages of the application programs of the first program importance level are classified as important notification messages; and application programs with an importance coefficient less than 8 in the T application programs may be determined as a second program importance level, and notification messages of the application programs of the second program importance level are classified as unimportant notification messages. Then, the important notification messages are displayed in a first display area on the notification message display page, and the unimportant notification messages are displayed in a second display area. The important notification messages may be displayed in front, and the unimportant notification messages may be displayed behind. A display order of each notification message in its display area may be further determined based on the importance coefficient of the notification message, for example, notification messages of application programs with higher importance coefficients are displayed in front.

For example, as shown in FIG. 2a, important notification messages and unimportant notification messages are displayed in different areas on the notification message display page 20. The notification messages of the application 1 and the application 2 are important notification messages, and the notification messages of the application 3 are unimportant notification messages. The importance coefficients of the application 1, the application 2, and the application 3 are sequentially from high to low. Therefore, on the notification message display page 20, the notification messages of the application 1 and the application 2 are displayed before the notification messages of application 3. The notification messages are also displayed in descending order of importance coefficients.

Similarly, when there are three program importance levels, the N notification messages of the T application programs may be divided into important notification messages, sub-important notification messages, and unimportant notification messages, and the N notification messages are displayed in different areas based on different importance levels. For example, as shown in FIG. 2b, important notification messages, sub-important notification messages, and unimportant notification messages are displayed in different areas on the notification message display page 20. The notification messages of the application 1 and the application 2 are important notification messages, the notification messages of the application 3 are sub-important notification messages, and the notification messages of the application 4 and the application 5 are unimportant notification messages. The importance coefficients of the application 1, the application 2, the application 3, the application 4, and application 5 are sequentially from high to low. Therefore, on the notification message display page 20, the notification messages of the application 1 and the application 2 are displayed in the front, the notification messages of application 3 are displayed in the medium area, and the notification messages of the application 4 and the application 5 are displayed in the end. The notification messages are also displayed in descending order of importance coefficients.

In this way, the N notification messages of the T application programs are displayed in different areas on the notification message display page based on the importance levels, so that the user can intuitively know which notification messages are important notification messages and which notification messages are unimportant notification messages. This helps the user to quickly view and process these notification messages, for example, quickly viewing the important notification messages or quickly deleting the unimportant notification messages.

Optionally, the determining importance coefficients of the T application programs based on the usage parameters of the T application programs includes:

calculating a utilization coefficient of each of the T application programs separately based on a use duration of the application program in a first preset period;

calculating an arrangement coefficient of each of the T application programs separately based on an arrangement order of an application icon of the application program on a desktop of an electronic device;

calculating a notification viewing duration coefficient of each of the T application programs separately based on a notification message viewing duration of the application program in a second preset period; and determining a sum of utilization coefficient, arrangement coefficient, and notification viewing duration coefficient of each application program as an importance coefficient of a corresponding application program.

To be specific, during determining of the program importance levels of the T application programs, an algorithm model may be used to calculate the importance coefficient of each application program. The algorithm model is for calculating the utilization coefficient, arrangement coefficient, and notification viewing duration coefficient of the application program to obtain the importance coefficient of the application program. Optionally, the importance coefficient is equal to the sum of the utilization coefficient, the arrangement coefficient, and the notification viewing duration coefficient.

A manner of calculating the utilization coefficient may be to determine the utilization coefficient based on the use duration of the application program in the first preset period. A longer use duration in the first preset period indicates a larger utilization coefficient. For example, statistics are collected on a use duration of each application program in a day to determine the utilization coefficient of the application program. The utilization coefficient is increased by 1 each time the use duration exceeds a specific time length. If the use duration is greater than or equal to 1 minute, the utilization coefficient is 1; and if the use duration is greater than or equal to 5 minutes, the utilization coefficient is 2. As derived by analogy, if the use duration is greater than or equal to 10 minutes, the utilization coefficient is 3; if the duration is greater than or equal to 15 minutes, the utilization coefficient is 4; and so on. The first preset period may be a period set by the system by default or a period defined by the user, for example, one week or one day.

A utilization coefficient of a target application program may be equal to a first target value plus 1, and the first target value is a ratio of a use duration of the target application program in the first preset period to a first preset duration. The target application program is any one of the T application programs.

That is, the utilization coefficient of the target application program may be obtained by dividing the use duration of the target application program in the first preset period by the first preset duration and adding 1. For example, the first preset duration is 5 minutes. If the user opens the [information APP] 5 times in one day, a duration each time not exceeding 1 minute, a utilization value is 5. If the user opens the [video APP] 2 times in one day, a duration each time not exceeding 30 minutes, a utilization value is $(30/5+1) \times 2 = 14$. In this case, [video APP] is located before [information APP] based on the utilization coefficients.

In this way, it can be ensured that the calculated utilization coefficients can truly reflect use statuses of the application programs and thus can accurately reflect the importance levels of the application programs. That is, a larger utilization coefficient of an application program indicates that the application program is used more frequently and has a higher importance level.

A manner of calculating the arrangement coefficient may be to determine the arrangement coefficient based on the arrangement order of the application icons of the application programs on the desktop of the electronic device. The arrangement order of the application icon on the desktop of the electronic device may be a screen position arranged on the desktop of the electronic device. Generally, the desktop of the electronic device may be divided into the home screen (the first screen), the second screen, the third screen, . . . , and so on. Optionally, an arrangement order of an application icon on the desktop of the electronic device being closer to the home screen indicates a larger arrangement coefficient; otherwise, a smaller arrangement coefficient is obtained. For example, arrangement coefficients of applications (including applications in fixed positions at the bottom) on the home screen are equal to [total number of screens], arrangement coefficients of applications on the second screen are equal to [total number of screens−1], arrangement coefficients of applications on the third screen are equal to [total number of screens−2], and so on.

An arrangement coefficient of the target application program may be equal to a second target value plus 1, and the second target value is a difference between a total number of screens on the desktop of the electronic device and an arrangement screen index of an application icon of the target application program on the desktop of the electronic device.

That is, the difference obtained by subtracting the arrangement screen index of the application icon of the target application program on the desktop of the electronic device from the total number of screens on the desktop of the electronic device is added by 1 to obtain the arrangement coefficient. For example, there are five screens of applications on the electronic device. Applications on the first screen have an arrangement coefficient of $5-1+1=5$, applications on the second screen have an arrangement coefficient of $5-2+1=4$, applications on the third screen have an arrangement coefficient of $5-3+1=3$, and so on.

In this way, it can be ensured that the calculated arrangement coefficient can truly reflect an arrangement position and importance level of the application program on the desktop, that is, a larger arrangement coefficient of the application program indicates that the application program is closer to the home screen and has a higher importance degree.

A manner of calculating the notification viewing duration coefficient may be determining the notification viewing duration coefficient based on the notification message viewing duration of the application program in the second preset period. The notification message viewing duration may be a duration of viewing a notification message, optionally, a notification message viewing duration in the second preset period. If the notification viewing duration coefficient is large, for example, the notification message viewing duration is greater than or equal to 30 seconds, the notification viewing duration coefficient is 1; if the notification message viewing duration is greater than or equal to 1 minute, the notification viewing duration coefficient is 2; and so on. The second preset period may be a period set by the system by default or a period defined by the user, for example, one day or one week.

A notification viewing duration coefficient of the target application program is equal to a ratio of a notification message viewing duration of the target application program within the second preset period to a second preset duration.

That is, the notification viewing duration coefficient of the target application program may be obtained by dividing the notification message viewing duration in the second preset period by the second preset duration. For example, the second preset duration is 30 seconds. If a notification message viewing duration of an application program in one day is 1 minute, the notification viewing duration coefficient is equal to $1/0.5=2$.

In this way, it can be ensured that the calculated notification viewing duration coefficient can truly reflect a degree of attention that the user pays to the notification messages of the application program, that is, a larger notification viewing duration coefficient of the application program indicates that the user pays more attention to the notification messages of the application program and the application program also has a higher importance degree.

After the utilization coefficient, the arrangement coefficient, and the notification viewing duration coefficient of each of the T application programs are obtained through calculation in the foregoing manner, the sum of the utilization coefficient, the arrangement coefficient, and the notification viewing time coefficient of each application program may be calculated, so as to obtain an importance coefficient of a corresponding application program.

For example, a first application program is started 5 times in one day, being used for 5 minutes each time and totaling a use duration of 35 minutes, and therefore a utilization coefficient of the first application program is $35/5+1=8$. An application icon of the first application program is arranged on the first screen (a total of 3 screens), and therefore an arrangement coefficient of the first application program is 3. A notification message viewing duration of the first application program in one day is 4.5 minutes, and therefore a notification viewing duration coefficient of the first application program is 4.5/0.5=9. In this case, an importance coefficient of the first application program is 8+3+9=20.

A use duration of a second application program in one day is 10 minutes, and therefore a utilization coefficient of the second application program is 10/5+1=3. An application icon of the second application program is arranged on the third screen (a total of 3 screens), and therefore an arrangement coefficient of the second application program is 1. A notification message viewing duration of the second application program in one day is 0.5 minutes, and therefore a notification viewing duration coefficient of the second application program is 0.5/0.5=1. In this case, an importance coefficient of the second application program is 3+1+1=5. It may be learned that the importance coefficient of the first application program is greater than the importance coefficient of the second application program. Assuming that an importance coefficient threshold for distinguishing important levels from unimportant levels is 8, notification messages of the first application program are important notification messages, and notification messages of the second application program are unimportant notification messages.

In this way, the importance coefficient of each application program may be quickly obtained by calculating the utilization coefficient, arrangement coefficient, and notification viewing duration coefficient of the application program. With importance coefficients calculated based on this, importance degrees of the notification messages of the application programs can be better evaluated, further effectively helping the user to quickly view important notification messages.

Optionally, notification messages in each of the M display areas are displayed in descending order of importance coefficients of application programs corresponding to the notification messages.

That is, a display order of notification messages in each display area may be determined based on importance coefficients of application programs corresponding to the notification messages in the display area. Notification messages of application programs with a higher importance coefficient have display positions in the front of the display area, and notification messages of application programs with a lower importance coefficient have display positions in the back of the display area. For example, as shown in FIG. 2a, an importance coefficient of the application 1 is greater than an importance coefficient of the application 2. Therefore, in the display area of important notification messages, the notification messages of the application 1 are displayed before the notification messages of the application 2.

In this way, a display order of each notification message in its display area may be further determined based on an importance coefficient of the application program, so that the user may learn importance degrees of the notification messages in each display area. This helps the user to sequentially process the notification messages in descending order of importance coefficients.

Optionally, display content of each notification message includes at least two or all of application icon, notification time, notification title, notification content of preset length, and picture.

That is, when the target information of the N notification messages is displayed in the M display areas, an application icon, notification push time, notification title, and notification content of a preset length that are corresponding to each notification message, as well as picture in the notification message may be displayed. The notification content of the preset length may be the first two lines of content in the notification message, for example, as shown in FIG. 2a and FIG. 2b, display materials of each notification message include an application icon, notification time, notification title, the first two lines of notification content, and picture.

In this way, with the display content in the M display areas, the user may clearly learn about information such as an application program to which each notification message belongs and general content of the notification message, and may select and view notification messages of interest based on such information.

Optionally, after step 102, the method further includes:
receiving a first sliding input performed by a user on a target display area of the M display areas; and
clearing, in response to the first sliding input, P notification messages through which a sliding track of the first sliding input runs; where
P is a positive integer.

After viewing the notification messages displayed in the M display areas, the user may perform some processing on the notification messages, for example, deleting some notification messages, turning off a message notification function for some application programs, or clearing notification messages.

In this implementation, the user may delete some notification messages in the M display areas by performing a specific input. Optionally, the user may perform the first sliding input in the target display area of the M display areas to clear the P notification messages in an area through which the sliding track of the first sliding input runs. The target display area may be one or more of the M display areas, and the P notification messages through which the sliding track of the first sliding input runs may be one or more. The first sliding input may be a sliding input of a specific sliding direction, and the first sliding input is responded to only when the sliding direction of the first sliding input matches the specific sliding direction.

In this way, the user may quickly delete one or more notification messages in the M display areas by performing the first sliding input in the target display area of the M display areas.

Optionally, the target information includes an application icon of an application program to which each notification message belongs and characteristic information of each notification message.

The clearing, in response to the first sliding input, P notification messages through which a sliding track of the first sliding input runs includes:
obtaining a sliding direction of the first sliding input;
obtaining P pieces of target information through which an input track of the first sliding input runs; and
in a case that the sliding direction of the first sliding input is a first preset direction, clearing P notification messages corresponding to the P pieces of target information; where
the first sliding input is an input on at least one of application icon and characteristic information of the P pieces of target information.

That is, when the target information of the N notification messages is displayed in the M display areas, the application icon of the application program to which each notification message belongs and the characteristic information of each notification message may be displayed, and the characteristic information may be part or all of notification time, notification title, notification content of preset length, and picture. The first sliding input being an input on at least one of application icon and characteristic information of the P pieces of target information means that the sliding track of the first sliding input may run through the application icons of the P pieces of target information, or may run through the characteristic information of the P pieces of target information, or may run through both the application icons and the characteristic information of the P pieces of target information.

After the first sliding input is received, the sliding direction of the first sliding input may be obtained and the P pieces of target information through which the input track of the first sliding input runs may be obtained, so as to determine whether the sliding direction is the first preset direction. In a case that the sliding direction is the first preset direction, the P notification messages corresponding to the P pieces of target information through which the input track of the first sliding input runs are determined, and the P notification messages are cleared. The first preset direction may be an inclination direction of a preset angle, such as a 45-degree inclination direction or a 60-degree inclination direction, with a specific allowable range of errors, for example, an allowable error of ±5 degrees.

Figure 3:
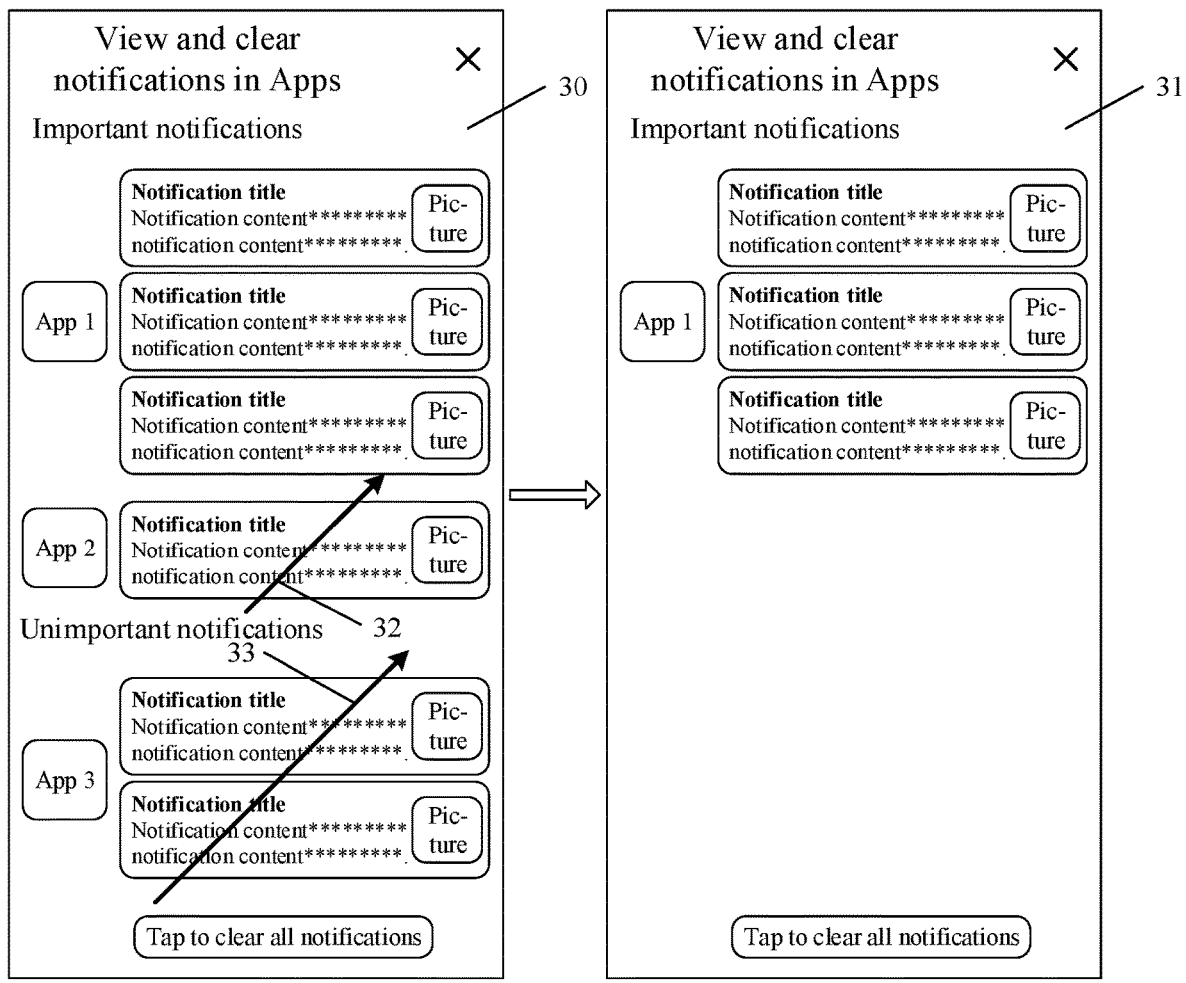
FIG. 3 is a schematic diagram of an operation of quickly deleting a plurality of application notification messages on a notification message display page according to an embodiment of this application.

That is, if a sliding input of the first preset direction performed by the user in the target display area among the M display areas is received, notification messages corresponding to the target information through which the first sliding input runs may be cleared, where the crossed-out notification messages are no longer displayed in the M display areas. For example, as shown in FIG. 3, the user performs a sliding input along a 45-degree direction in an area in which notification messages of the application 2 are located on the notification message display page 30, that is, a sliding track 32 of the sliding input runs through the area in which notification messages of the application 2 are located. A sliding input 33 along a 45-degree direction is also performed in an area in which two notification messages of the application 3 are located, that is, a sliding track 33 of the sliding input runs through the area in which the two notification messages of the application 3 are located, so as to delete the notification messages of the application 2 and the application 3, leaving notification messages of the application 1 on the notification message display page 31 after deletion is completed.

In this way, the user may perform a sliding input of the first preset direction in the M display areas, with a sliding track of the sliding input running through positions in which one or more notification messages expected to be deleted are located, so that the notification messages can be quickly deleted, featuring simple and easy user operation. In addition, the first preset direction is specified to prevent false triggering.

It should be noted that, in this implementation, after some notification messages are deleted in response to the user input, message badges on application icons corresponding to the notification messages may be also cleared, not requiring the user to clear the application icons with message badges by tapping the icons on the desktop one by one.

Optionally, after step 102, the method further includes:
receiving a third sliding input performed by a user on a target notification message in the M display areas;
in response to the third sliding input, obtaining a sliding direction of the third sliding input; and
in a case that the sliding direction of the third sliding input is a third preset direction, clearing the target notification message.

That is, in this implementation, the user may perform a sliding input of the third preset direction in an area in which the target notification message is located in the M display areas, to clear the target notification message. In other words, a sliding input of the third preset direction is performed on a specific notification message, so that a single notification message can be deleted. The third preset direction may be an inclination direction of a preset angle, such as a 15-degree inclination direction or a 20-degree inclination direction, with a specific allowable range of errors, for example, an allowable error of ±5 degrees.

In other words, if the third sliding input performed by a user on the target notification message in the M display areas is received, and the sliding direction of the third sliding input is consistent with the third preset direction, the target notification message can be deleted.

Figure 4:
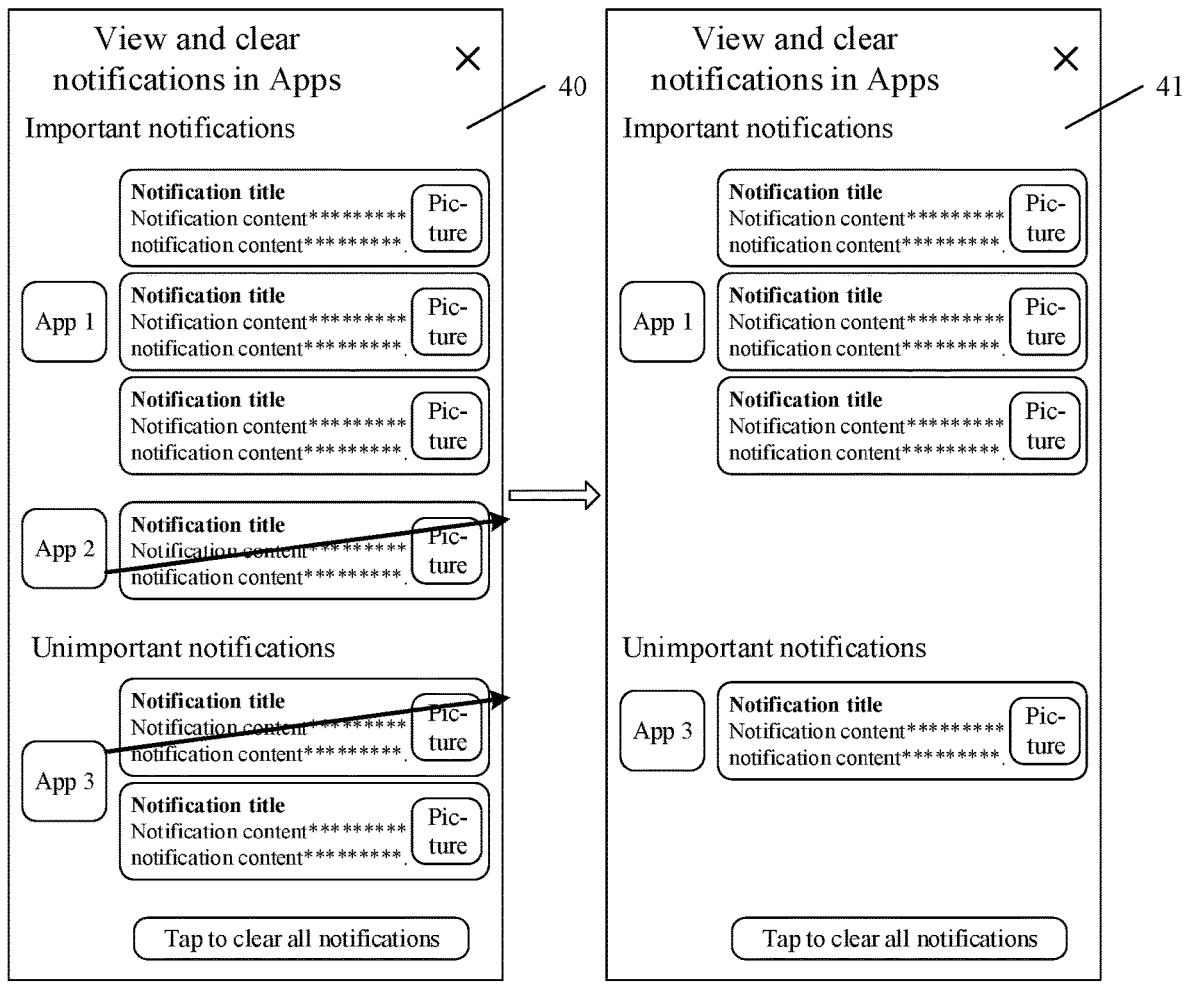
FIG. 4 is a schematic diagram of an operation of quickly deleting one application notification message on a notification message display page according to an embodiment of this application.

For example, as shown in FIG. 4, the user performs a sliding input along a 15-degree direction separately in areas in which one notification message of the application 2 and the first notification message of the application 3 are located on the notification message display page 40, to correspondingly delete the one notification message of the application 2 and the first notification message of the application 3, and after deletion is completed, the notification messages of the application 1 and the second notification message of the application 3 remain on the notification message display page 41.

In this way, the user may perform a sliding input along the third preset direction in an area which a specific notification message expected to be deleted is located in the M display areas, to quickly delete a single notification message in the M display areas, featuring simple and easy user operation. In addition, the third preset direction is specified to prevent false triggering.

Also, it should be noted that, in this implementation, after a specific notification message is deleted in response to the user input, a message badge on an application icon corresponding to the notification message may be cleared at the same time, not requiring the user to perform clearing by tapping an application icon of the application program to which the notification message belongs on the desktop.

Optionally, the target information includes an application icon of an application program to which each notification message belongs.

After step 102, the method further includes:
receiving a second sliding input performed by a user on a target application icon;
in response to the second sliding input, obtaining a sliding direction of the second sliding input; and
in a case that the sliding direction of the second sliding input is a second preset direction, turning off a message notification function of an application program corresponding to the target application icon.

In this implementation, the M display areas display the application icon of the application program to which each notification message belongs, and the user may perform a specific input on an application icon corresponding to a specific notification message to turn off message notification for the application program to which the notification message belongs. That is, do-not-disturb is turned on for message notification of the application program, so that a reminder is no longer provided for notification messages of the application program in the future and notification messages of the application program displayed in the M display areas may also be deleted.

Optionally, the user may perform a sliding input along the second preset direction on the target application icon to turn off the message notification function of the application program corresponding to the target application icon. The second preset direction may be an inclination direction of a preset angle, such as 90-degree inclination direction or 80-degree inclination direction, with a specific allowable range of errors, for example, an allowable error of ±10 degrees. The target application icon may be an application icon that is displayed in the M display areas and that is of an application program to which any one notification message belongs to.

That is, if the second sliding input performed by a user on the target application icon is received, and the sliding direction of the second sliding input is consistent with the second preset direction, the message notification function of the application program corresponding to the target application icon may be turned off, and a reminder is no longer provided for notification messages of the application program in the future. To be specific, the notification messages of the application program are no longer displayed on the future notification message display page, and a forbidden sign is displayed on the target application icon on the current notification message display page to indicate do-not-disturb being turned on for notification messages of the application program.

Figure 5:
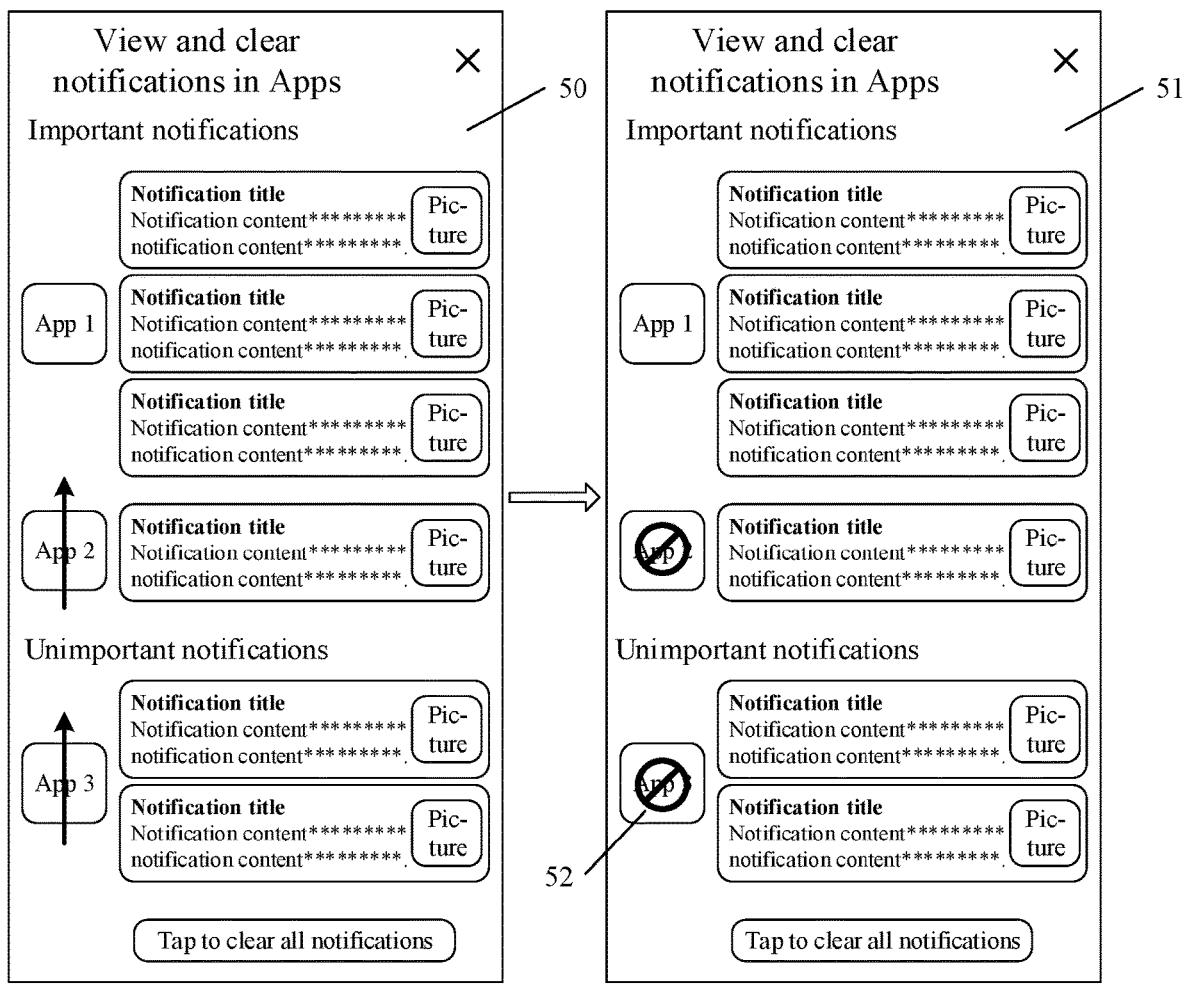
FIG. 5 is a schematic diagram of an operation of turning off an application notification on a notification message display page according to an embodiment of this application.

For example, as shown in FIG. 5, the user performs a sliding input along a 90-degree direction on icons of the application 2 and the application 3 on the notification message display page 50, to turn off the message notification function for the application 2 and the application 3, and after the message notification is turned off, a forbidden sign 52 is displayed separately on the icons of the application 2 and the application 3 on the notification message presentation page 51.

In this way, the user may quickly turn off message notification for some applications by performing a sliding input along the second preset direction on application icons in the M display areas, without entering the system setting page to perform related settings. In addition, the user may perform only one operation to delete notification messages of an application program and turn off the message notification function of the application program. Moreover, the second preset direction is specified to prevent false triggering.

It should be noted that, in this implementation, after message notifications of some application programs are turned off in response to a user input, message badges on application icons of the application programs may be also cleared, and a message badge reminder is no longer provided for later notification messages of the application programs.

Optionally, after step 102, the method further includes:
  receiving a touch input performed by a user on a preset control; and
  in response to the touch input, clearing the N notification messages from the M display areas, and deleting message badges on application icons of the T application programs.

That is, in this implementation, the M display areas may also display a preset control for clearing all notification messages with one tap, and the user may tap the preset control to implement clearing of all the notification messages in the M display areas with one tap and also clear all message badges on application icons corresponding to the notification messages. That is, if a tap input performed by a user on the preset control is received, the N notification messages in the M display areas may be cleared, and all message badges on application icons of the T application programs may be cleared.

For example, as shown in FIG. 2a, a control 21 for clearing all notifications with one tap is displayed on the notification message display page 20. The user may tap the control to perform clearing of all notification messages with one tap on the notification message display page 20 and also to clear message badges on application icons of the application 1 to the application 5 corresponding to the notification messages.

In this way, the user may tap the preset control to perform clearing of all the notification messages with one tap and to clear message badges of application icons corresponding to the notification messages, instead of tapping the application icons with message badges on the desktop one by one.

Optionally, after step 102, the method further includes:
  receiving a preset touch input performed by a user; and
  in response to the preset touch input, closing the notification message display page in which the M display areas are located.

That is, in this implementation, the user may perform the preset touch input to exit the notification message display page displaying the N notification messages of the T application programs. The preset touch input may be a close button for controlling the notification message display page, or a [Home] key or a [Back] key for controlling a navigation bar. After the notification message display page is closed, it may return to the system desktop or return to an original display page that is a page before the notification message display page is entered.

Figure 6:
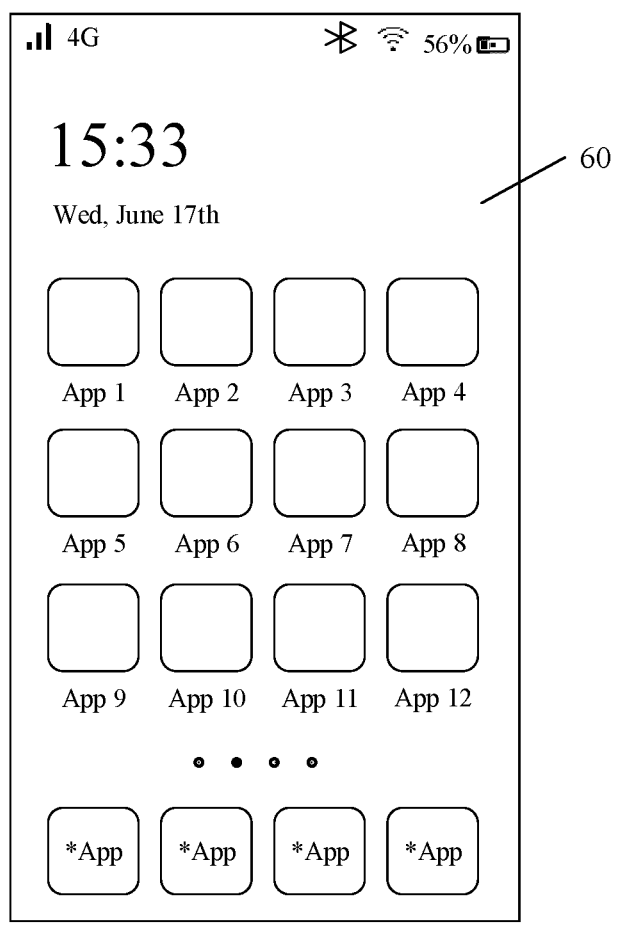
FIG. 6 is a schematic diagram of returning to a system desktop after closing a notification message display page according to an embodiment of this application.

For example, as shown in FIG. 2a, a close button 22 is displayed on the notification message display page 20, and the user may tap the button to close the notification message display page 20 and return to a system desktop page 60 shown in FIG. 6.

In this way, the user may perform the preset touch input to exit the notification message display page and return to the system desktop or the original page.

According to the notification message display control method in this embodiment of this application, the N notification messages of the T application programs are obtained. In the M display areas, the target information of the N notification messages is displayed. Different display areas are used for displaying notification messages of different program importance levels. The program importance level is an importance level of the application program, M, N, and T are all integers greater than 1, and M and T are both less than or equal to N. In this way, the N notification messages of the T application programs are displayed based on program importance levels in different display areas of the M display areas, and the user may intuitively know which notification messages have higher importance levels and which notification messages have lower importance levels. This helps the user to quickly view and process the notification messages, and improves the message processing efficiency.

It should be noted that the notification message display control method provided in the embodiments of this application may be executed by a notification message display control apparatus, or a control module for executing the notification message display control method in the notification message display control apparatus. In the embodiments of this application, the notification message display control method being executed by the notification message display control apparatus is used as an example to describe the notification message display control apparatus in the embodiments of this application.

Figure 7:
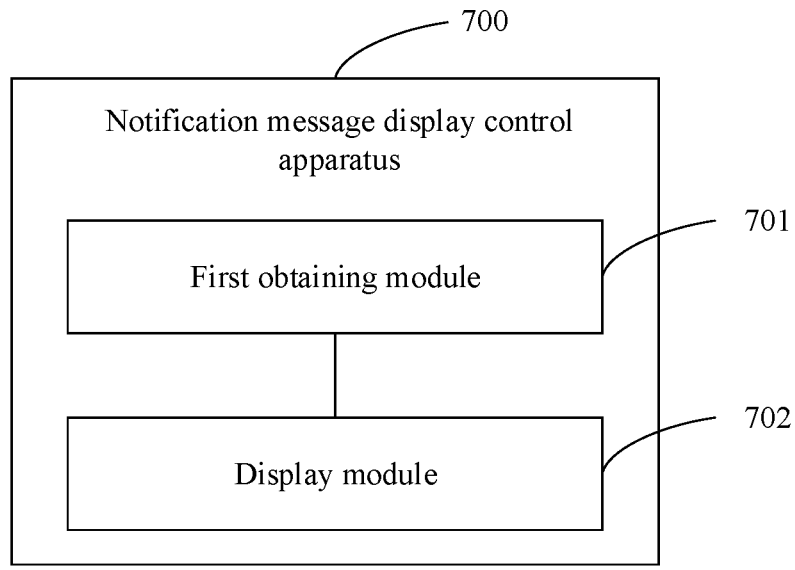
FIG. 7 is a schematic structural diagram of a notification message display control apparatus according to an embodiment of this application.

Refer to FIG. 7. FIG. 7 is a schematic structural diagram of a notification message display control apparatus according to an embodiment of this application. As shown in FIG. 7, the notification message display control apparatus 700 includes:
  a first obtaining module 701, configured to obtain N notification messages of T application programs; and a display module 702, configured to display target information of the N notification messages separately in M display areas; where
different display areas are used for displaying notification messages of different program importance levels, the program importance level is an importance level of an application program, M, N, and T are all integers greater than 1, and M and T are both less than or equal to N.

Optionally, the notification message display control apparatus 700 further includes:
a second obtaining module, configured to obtain usage parameters of the T application programs;
a first determining module, configured to determine program importance levels of the T application programs based on the usage parameters of the T application programs; and
a second determining module, configured to determine the M display areas based on the program importance levels of the T application programs.

Optionally, the first determining module includes:
a first determining unit, configured to determine importance coefficients of the T application programs based on the usage parameters of the T application programs; and
a second determining unit, configured to determine, based on the importance coefficients of the T application programs, a program importance level to which each of the T application programs belongs; where
different program importance levels correspond to different importance coefficient ranges.

Optionally, notification messages in each of the M display areas are displayed in descending order of importance coefficients of application programs corresponding to the notification messages.

Optionally, the first determining unit includes:
a first calculation subunit, configured to calculate a utilization coefficient of each of the T application programs separately based on a use duration of the application program in a first preset period;
a second calculation subunit, configured to calculate an arrangement coefficient of each of the T application programs separately based on an arrangement order of an application icon of the application program on a desktop of an electronic device;
a third calculation subunit, configured to calculate a notification viewing duration coefficient of each of the T application programs separately based on a notification message viewing duration of the application program in a second preset period; and
a fourth calculation subunit, configured to determine a sum of utilization coefficient, arrangement coefficient, and notification viewing duration coefficient of each application program as an importance coefficient of a corresponding application program.

Optionally, a utilization coefficient of a target application program is equal to a first target value plus 1, and the first target value is a ratio of a use duration of the target application program within the first preset period to a first preset duration;
an arrangement coefficient of the target application program is equal to a second target value plus 1, and the second target value is a difference between a total number of screens on the desktop of the electronic device and an arrangement screen index of an application icon of the target application program on the desktop of the electronic device; and
a notification viewing duration coefficient of the target application program is equal to a ratio of a notification message viewing duration of the target application program within the second preset period to a second preset duration; where
the target application program is any one of the T application programs.

Optionally, an application icon of each of the T application programs includes a message badge, and the message badge is used to indicate the number of notification messages of each application program.

Optionally, the notification message display control apparatus 700 further includes:
a first receiving module, configured to receive a first sliding input performed by a user on a target display area of the M display areas; and
a first processing module, configured to: in response to the first sliding input, clear P notification messages through which a sliding track of the first sliding input runs; where
P is a positive integer.

Optionally, the target information includes an application icon of an application program to which each notification message belongs and characteristic information of each notification message.

The first processing module includes:
a first obtaining unit, configured to obtain a sliding direction of the first sliding input;
a second obtaining unit, configured to obtain P pieces of target information through which an input track of the first sliding input runs; and
a processing unit, configured to: in a case that the sliding direction of the first sliding input is a first preset direction, clear P notification messages corresponding to the P pieces of target information; where
the first sliding input is an input on at least one of application icon and characteristic information of the P pieces of target information.

Optionally, the target information includes an application icon of an application program to which each notification message belongs.

The notification message display control apparatus 700 further includes:
a second receiving module, configured to receive a second sliding input performed by a user on a target application icon;
a third obtaining module, configured to: in response to the second sliding input, obtain a sliding direction of the second sliding input; and
a second processing module, configured to: in a case that the sliding direction of the second sliding input is a second preset direction, turn off a message notification function of an application program corresponding to the target application icon.

Optionally, the notification message display control apparatus 700 further includes:
a third receiving module, configured to receive a touch input performed by a user on a preset control; and
a third processing module, configured to: in response to the touch input, clear the N notification messages from the M display areas, and delete message badges on application icons of the T application programs.

The notification message display control apparatus in the embodiment of this application obtains N notification messages of T application programs and displays target information of the N notification messages separately in M display areas, where different display areas are used for displaying notification messages of different program importance levels, the program importance level is an importance level of an application program, M, N, and T are all integers greater than 1, and M and T are both less than or equal to N. In this way, the N notification messages of the T application programs are separately displayed based on the program importance levels in different display areas of the M display areas, and the user may intuitively know which notification messages have higher importance levels and which notification messages have lower importance levels. This helps the user to quickly view and process the notification messages, and improves the message processing efficiency.

The notification message display control apparatus in this embodiment of this application may be an apparatus, or may be a component, an integrated circuit, or a chip in a terminal. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The notification message display control apparatus in this embodiment of this application may be an apparatus having an operating system. The operating system may be an Android operating system, an iOS operating system, or other possible operating systems, and is not specifically limited in the embodiments of this application.

The notification message display control apparatus provided in this embodiment of this application is capable of implementing the processes implemented in the method embodiments in FIG. 1 to FIG. 6. To avoid repetition, details are not described herein again.

Figure 8:
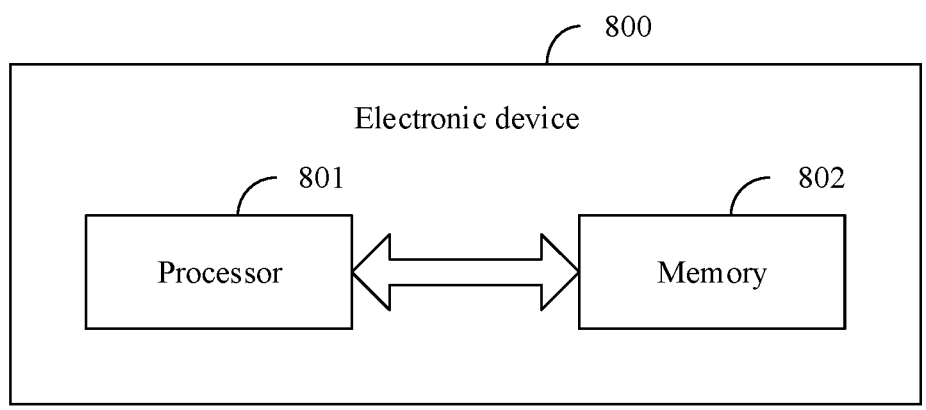
FIG. 8 is a schematic structural diagram of an electronic device according to an embodiment of this application.

Optionally, as shown in FIG. 8, an embodiment of this application further provides an electronic device 800, including a processor 801, a memory 802, and a program or instructions stored in the memory 802 and capable of running on the processor 801. When the program or the instructions are executed by the processor 801, the processes of the foregoing embodiment of the notification message display control method are implemented, with the same technical effects achieved. To avoid repetition, details are not described herein again.

It should be noted that the electronic device in this embodiment of this application includes the aforementioned mobile electronic device and non-mobile electronic device.

Figure 9:
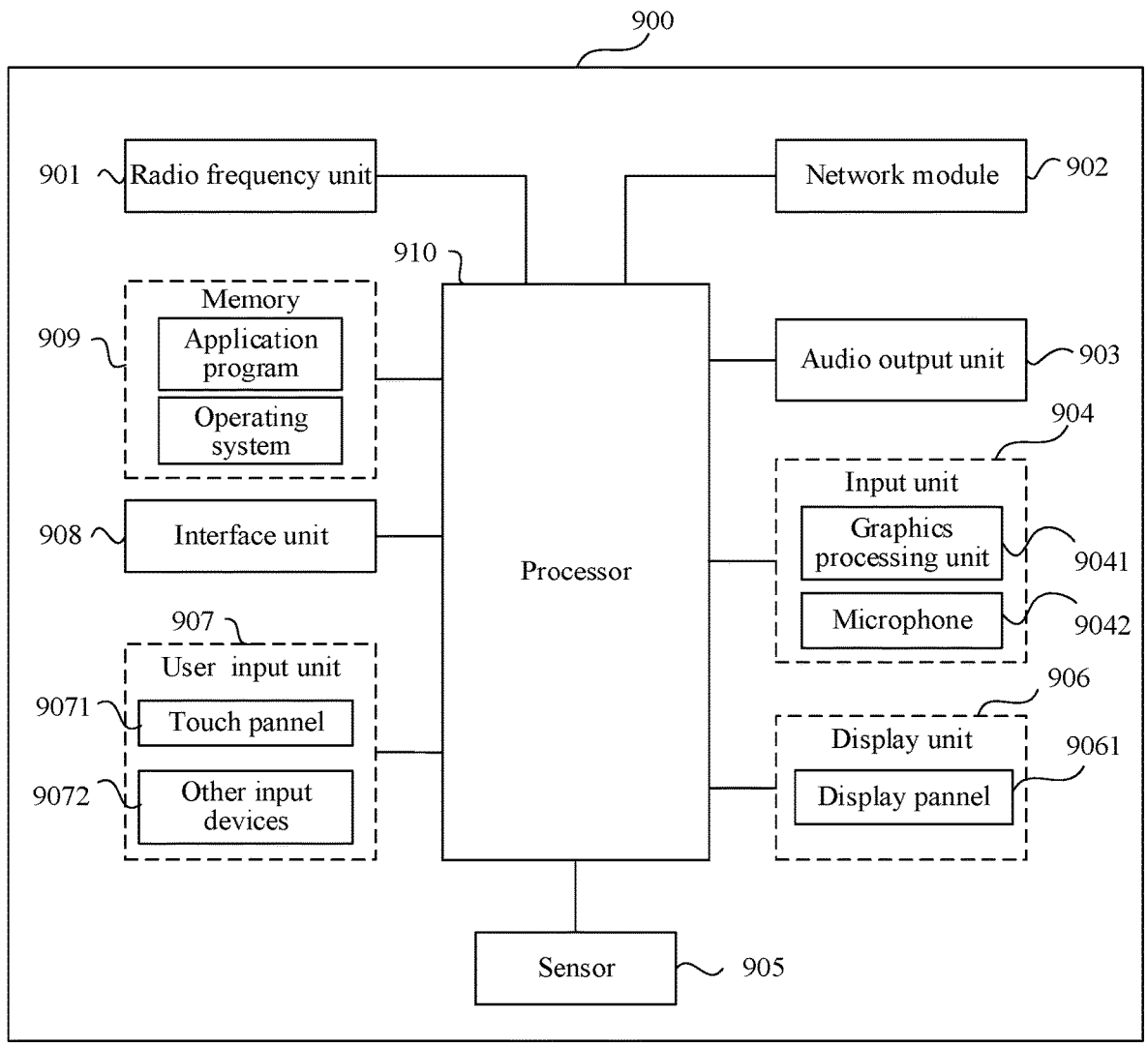
FIG. 9 is a schematic structural diagram of another electronic device according to an embodiment of this application.

FIG. 9 is a schematic diagram of a hardware structure of an electronic device for implementing the embodiments of this application.

The electronic device 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

A person skilled in the art may understand that the electronic device 900 may further include a power supply (for example, a battery) supplying power to all components, and the power supply may be logically connected to the processor 910 through a power management system. In this way, functions such as charge management, discharge management, and power consumption management are implemented by using the power management system. The structure of the electronic device shown in FIG. 9 does not constitute any limitation on the electronic device. The electronic device may include more or fewer components than shown in the figure, or a combination of some components, or the components disposed differently. Details are not repeated herein.

The processor 910 is configured to obtain N notification messages of T application programs.

The display unit 906 is configured to display target information of the N notification messages separately in M display areas.

Different display areas are used for displaying notification messages of different program importance levels, the program importance level is an importance level of an application program, M, N, and T are all integers greater than 1, and M and T are both less than or equal to N.

Optionally, the processor 910 is further configured to obtain usage parameters of the T application programs;
  determine program importance levels of the T application programs based on the usage parameters of the T application programs; and
  determine the M display areas based on the program importance levels of the T application programs.

Optionally, the processor 910 is further configured to determine importance coefficients of the T application programs based on the usage parameters of the T application programs; and
  determine, based on the importance coefficients of the T application programs, a program importance level to which each of the T application programs belongs.

Different program importance levels correspond to different importance coefficient ranges.

Optionally, notification messages in each of the M display areas are displayed in descending order of importance coefficients of application programs corresponding to the notification messages.

Optionally, the processor 910 is further configured to calculate a utilization coefficient of each of the T application programs separately based on a use duration of the application program in a first preset period;
  calculate an arrangement coefficient of each of the T application programs separately based on an arrangement order of an application icon of the application program on a desktop of an electronic device;
  calculate a notification viewing duration coefficient of each of the T application programs separately based on a notification message viewing duration of the application program in a second preset period; and
  determine a sum of utilization coefficient, arrangement coefficient, and notification viewing duration coefficient of each application program as an importance coefficient of a corresponding application program.

Optionally, a utilization coefficient of a target application program is equal to a first target value plus 1, and the first target value is a ratio of a use duration of the target application program within the first preset period to a first preset duration;
  an arrangement coefficient of the target application program is equal to a second target value plus 1, and the second target value is a difference between a total number of screens on the desktop of the electronic device and an arrangement screen index of an application icon of the target application program on the desktop of the electronic device; and
  a notification viewing duration coefficient of the target application program is equal to a ratio of a notification message viewing duration of the target application program within the second preset period to a second preset duration; where the target application program is any one of the T application programs.

Optionally, an application icon of each of the T application programs includes a message badge, and the message badge is used to indicate the number of notification messages of each application program.

Optionally, the user input unit 907 is configured to receive a first sliding input performed by a user on a target display area of the M display areas.

The processor 910 is further configured to: in response to the first sliding input, clear P notification messages through which a sliding track of the first sliding input runs; where P is a positive integer.

Optionally, the target information includes an application icon of an application program to which each notification message belongs and characteristic information of each notification message.

The processor 910 is further configured to obtain a sliding direction of the first sliding input;

obtain P pieces of target information through which an input track of the first sliding input runs; and in a case that the sliding direction of the first sliding input is a first preset direction, clear P notification messages corresponding to the P pieces of target information; where the first sliding input is an input on at least one of application icon and characteristic information of the P pieces of target information.

Optionally, the target information includes an application icon of an application program to which each notification message belongs.

The user input unit 907 is further configured to receive a second sliding input performed by a user on a target application icon.

The processor 910 is further configured to: in response to the second sliding input, obtain a sliding direction of the second sliding input; and in a case that the sliding direction of the second sliding input is a second preset direction, turn off a message notification function of an application program corresponding to the target application icon.

Optionally, the user input unit 907 is further configured to receive a touch input performed by a user on a preset control.

The processor 910 is further configured to: in response to the touch input, clear the N notification messages from the M display areas, and delete message badges on application icons of the T application programs.

The electronic device in this embodiment of this application obtains the N notification messages of the T application programs. In the M display areas, the target information of the N notification messages is displayed. Different display areas are used for displaying notification messages of different program importance levels. The program importance level is an importance level of the application program, M, N, and T are all integers greater than 1, and M and T are both less than or equal to N. In this way, the N notification messages of the T application programs are displayed based on program importance levels in different display areas of the M display areas, and the user may intuitively know which notification messages have higher importance levels and which notification messages have lower importance levels. This helps the user to quickly view and process the notification messages, and improves the message processing efficiency.

It may be understood that in this embodiment of this application, the input unit 904 may include a graphics processing unit (GPU) 9041 and a microphone 9042. The graphics processing unit 9041 processes image data of a still picture or video obtained by an image capture apparatus (such as a camera) in a video capture mode or an image capture mode. The display unit 906 may include a display panel 9061, and the display panel 9061 may be configured in a form of a liquid crystal display, an organic light-emitting diode, and the like. The user input unit 907 may include a touch panel 9071 and other input devices 9072. The touch panel 9071 is also referred to as a touchscreen. The touch panel 9071 may include two parts: a touch detection apparatus and a touch controller. The other input devices 9072 may include but are not limited to a physical keyboard, a function key (such as a volume control key or a power on/off key), a trackball, a mouse, a joystick, and the like. Details are not described herein. The memory 909 may be configured to store software programs and various data, including but not limited to application programs and an operating system. An application processor and a modem processor may be integrated into the processor 910. The application processor mainly processes an operating system, a user interface, an application program, and the like. The modem processor mainly processes wireless communication. It may be understood that the modem processor may alternatively be not integrated in the processor 910.

An embodiment of this application further provides a readable storage medium, where a program or instructions are stored in the readable storage medium. When the program or the instructions are executed by a processor, the processes of the foregoing embodiment of the notification message display control method may be implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to run a program or instructions to implement the foregoing notification message display control method embodiments, with the same technical effects achieved. To avoid repetition, details are not described herein again.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A notification message display control method, comprising:
   obtaining N notification messages of T application programs; and
   displaying target information of the N notification messages separately in M display areas; wherein
   different display areas are used for displaying notification messages of different program importance levels, the program importance level is an importance level of an application program, M, N, and T are all integers greater than 1, and M and T are both less than or equal to N;
   wherein before the displaying target information of the N notification messages separately in M display areas, further comprising:
   obtaining usage parameters of the T application programs;
   determining program importance levels of the T application programs based on the usage parameters of the T application programs; and
   determining the M display areas based on the program importance levels of the T application programs.

2. The method according to claim 1, wherein the determining program importance levels of the T application programs based on the usage parameters of the T application programs comprises:
   determining importance coefficients of the T application programs based on the usage parameters of the T application programs; and
   determining, based on the importance coefficients of the T application programs, a program importance level to which each of the T application programs belongs; wherein
   different program importance levels correspond to different importance coefficient ranges.

3. The method according to claim 2, wherein notification messages in each of the M display areas are displayed in descending order of importance coefficients of application programs corresponding to the notification messages.

4. The method according to claim 2, wherein the determining importance coefficients of the T application programs based on the usage parameters of the T application programs comprises:
   calculating a utilization coefficient of each of the T application programs separately based on a use duration of the application program in a first preset period;
   calculating an arrangement coefficient of each of the T application programs separately based on an arrangement order of an application icon of the application program on a desktop of an electronic device;
   calculating a notification viewing duration coefficient of each of the T application programs separately based on a notification message viewing duration of the application program in a second preset period; and
   determining a sum of utilization coefficient, arrangement coefficient, and notification viewing duration coefficient of each application program as an importance coefficient of a corresponding application program.

5. The method according to claim 4, wherein a utilization coefficient of a target application program is equal to a first target value plus 1, and the first target value is a ratio of a use duration of the target application program within the first preset period to a first preset duration;
   an arrangement coefficient of the target application program is equal to a second target value plus 1, and the second target value is a difference between a total number of screens on the desktop of the electronic device and an arrangement screen index of an application icon of the target application program on the desktop of the electronic device; and
   a notification viewing duration coefficient of the target application program is equal to a ratio of a notification message viewing duration of the target application program within the second preset period to a second preset duration; wherein
   the target application program is any one of the T application programs.

6. The method according to claim 1, wherein an application icon of each of the T application programs comprises a message badge, and the message badge is used to indicate the number of notification messages of each application program.

7. The method according to claim 1, wherein after the displaying target information of the N notification messages separately in M display areas, the method further comprises:
   receiving a first sliding input performed by a user on a target display area of the M display areas; and
   clearing, in response to the first sliding input, P notification messages through which a sliding track of the first sliding input runs; wherein
   P is a positive integer.

8. The method according to claim 7, wherein the target information comprises an application icon of an application program to which each notification message belongs and characteristic information of each notification message; and
   the clearing, in response to the first sliding input, P notification messages through which a sliding track of the first sliding input runs comprises:
   obtaining a sliding direction of the first sliding input;
   obtaining P pieces of target information through which an input track of the first sliding input runs; and in a case that the sliding direction of the first sliding input is a first preset direction, clearing P notification messages corresponding to the P pieces of target information; wherein the first sliding input is an input on at least one of application icon and characteristic information of the P pieces of target information.

9. The method according to claim 1, wherein after the displaying target information of the N notification messages separately in M display areas, the method further comprises:

receiving a touch input performed by a user on a preset control; and in response to the touch input, clearing the N notification messages from the M display areas, and deleting message badges on application icons of the T application programs.

10. A notification message display control method, comprising:

obtaining N notification messages of T application programs; and displaying target information of the N notification messages separately in M display areas; wherein different display areas are used for displaying notification messages of different program importance levels, the program importance level is an importance level of an application program, M, N, and T are all integers greater than 1, and M and T are both less than or equal to N;

wherein the target information comprises an application icon of an application program to which each notification message belongs; and after the displaying target information of the N notification messages separately in M display areas, the method further comprises:

receiving a second sliding input performed by a user on a target application icon;

in response to the second sliding input, obtaining a sliding direction of the second sliding input; and in a case that the sliding direction of the second sliding input is a second preset direction, turning off a message notification function of an application program corresponding to the target application icon.

11. An electronic device, comprising a processor, a memory, and a program or instruction stored in the memory and capable of running on the processor, wherein the program or the instruction, when executed by the processor, causes the electronic device to perform:

obtaining N notification messages of T application programs; and displaying target information of the N notification messages separately in M display areas; wherein different display areas are used for displaying notification messages of different program importance levels, the program importance level is an importance level of an application program, M, N, and T are all integers greater than 1, and M and T are both less than or equal to N;

wherein before the displaying target information of the N notification messages separately in M display areas, the program or instruction, when executed by the processor, causes the electronic device to further perform:

obtaining usage parameters of the T application programs;

determining program importance levels of the T application programs based on the usage parameters of the T application programs; and determining the M display areas based on the program importance levels of the T application programs.

12. The electronic device according to claim 11, wherein in the process of the determining program importance levels of the T application programs based on the usage parameters of the T application programs by the electronic device, the program or instruction, when executed by the processor, causes the electronic device to further perform:

determining importance coefficients of the T application programs based on the usage parameters of the T application programs; and determining, based on the importance coefficients of the T application programs, a program importance level to which each of the T application programs belongs; wherein different program importance levels correspond to different importance coefficient ranges.

13. The electronic device according to claim 12, wherein in the process of the determining importance coefficients of the T application programs based on the usage parameters of the T application programs by the electronic device, the program or instruction, when executed by the processor, causes the electronic device to further perform:

calculating a utilization coefficient of each of the T application programs separately based on a use duration of the application program in a first preset period;

calculating an arrangement coefficient of each of the T application programs separately based on an arrangement order of an application icon of the application program on a desktop of an electronic device;

calculating a notification viewing duration coefficient of each of the T application programs separately based on a notification message viewing duration of the application program in a second preset period; and determining a sum of utilization coefficient, arrangement coefficient, and notification viewing duration coefficient of each application program as an importance coefficient of a corresponding application program.

14. The electronic device according to claim 13, wherein a utilization coefficient of a target application program is equal to a first target value plus 1, and the first target value is a ratio of a use duration of the target application program within the first preset period to a first preset duration;

an arrangement coefficient of the target application program is equal to a second target value plus 1, and the second target value is a difference between a total number of screens on the desktop of the electronic device and an arrangement screen index of an application icon of the target application program on the desktop of the electronic device; and a notification viewing duration coefficient of the target application program is equal to a ratio of a notification message viewing duration of the target application program within the second preset period to a second preset duration; wherein the target application program is any one of the T application programs.

15. The electronic device according to claim 12, wherein notification messages in each of the M display areas are displayed in descending order of importance coefficients of application programs corresponding to the notification messages.

16. The electronic device according to claim 11, wherein after the displaying target information of the N notification messages separately in M display areas, the program or instruction, when executed by the processor, causes the electronic device to further perform:

receiving a first sliding input performed by a user on a target display area of the M display areas; and clearing, in response to the first sliding input, P notification messages through which a sliding track of the first sliding input runs; wherein P is a positive integer.

17. The electronic device according to claim 16, wherein the target information comprises an application icon of an application program to which each notification message belongs and characteristic information of each notification message; and in the process of the clearing, in response to the first sliding input, P notification messages through which a sliding track of the first sliding input runs by the electronic device, the program or instruction, when executed by the processor, causes the electronic device to further perform:

obtaining a sliding direction of the first sliding input;

obtaining P pieces of target information through which an input track of the first sliding input runs; and in a case that the sliding direction of the first sliding input is a first preset direction, clearing P notification messages corresponding to the P pieces of target information; wherein the first sliding input is an input on at least one of application icon and characteristic information of the P pieces of target information.

18. The electronic device according to claim 11, wherein the target information comprises an application icon of an application program to which each notification message belongs; and after the displaying target information of the N notification messages separately in M display areas, the program or instruction, when executed by the processor, causes the electronic device to further perform:

receiving a second sliding input performed by a user on a target application icon;

in response to the second sliding input, obtaining a sliding direction of the second sliding input; and in a case that the sliding direction of the second sliding input is a second preset direction, turning off a message notification function of an application program corresponding to the target application icon.

19. The electronic device according to claim 11, wherein after the displaying target information of the N notification messages separately in M display areas, the program or instruction, when executed by the processor, causes the electronic device to further perform:

receiving a touch input performed by a user on a preset control; and in response to the touch input, clearing the N notification messages from the M display areas, and deleting message badges on application icons of the T application programs.

20. The electronic device according to claim 11, wherein an application icon of each of the T application programs comprises a message badge, and the message badge is used to indicate the number of notification messages of each application program.

\* \* \* \* \*